(12) United States Patent
Kang

(10) Patent No.: US 10,714,886 B2
(45) Date of Patent: *Jul. 14, 2020

(54) HIGH-Q AMPLIFIED RESONATOR

(71) Applicant: LGS Innovations LLC, Herndon, VA (US)

(72) Inventor: Inuk Kang, Holmdel, NJ (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/897,637

(22) Filed: Feb. 15, 2018

(65) Prior Publication Data

US 2018/0183202 A1 Jun. 28, 2018

Related U.S. Application Data

(63) Continuation of application No. 15/407,966, filed on Jan. 17, 2017, now Pat. No. 9,948,056.

(60) Provisional application No. 62/398,263, filed on Sep. 22, 2016.

(51) Int. Cl.
*H01S 3/10* (2006.01)
*H01S 3/16* (2006.01)
*H01S 3/083* (2006.01)
*G02B 6/12* (2006.01)
*H01S 3/102* (2006.01)
*H01S 3/063* (2006.01)
*G02B 6/293* (2006.01)

(52) U.S. Cl.
CPC ........ *H01S 3/0637* (2013.01); *G02B 6/29338* (2013.01); *H01S 3/10084* (2013.01); *G02B 6/12007* (2013.01); *H01S 3/083* (2013.01); *H01S 3/1028* (2013.01); *H01S 3/1608* (2013.01)

(58) Field of Classification Search
CPC ............ H01S 3/06737; H01S 3/06791; H01S 3/0637; G02B 6/29338
See application file for complete search history.

(56) References Cited

U.S. PATENT DOCUMENTS

| | | | |
|---|---|---|---|
| 5,319,727 A | 6/1994 | Ford et al. | |
| 7,333,691 B1 | 2/2008 | Gill et al. | |
| 7,480,425 B2 | 1/2009 | Gunn et al. | |
| 7,595,890 B2 | 9/2009 | Fan et al. | |
| 7,903,255 B2 | 3/2011 | Kaplan | |
| 8,619,358 B2 | 12/2013 | Kimerling et al. | |

(Continued)

FOREIGN PATENT DOCUMENTS

| JP | 02-253675 A | 10/1990 |
|---|---|---|
| WO | WO2014197780 A1 | 12/2014 |

OTHER PUBLICATIONS

Preston, et al., Slot Waveguides With Polycrystalline Silicon for Electrical Injection, Optics Express, vol. 17, No. 3, Feb. 2, 20019, OSA Publishing, USA, p. 1527-1534.

(Continued)

*Primary Examiner* — Eric L Bolda
(74) *Attorney, Agent, or Firm* — Baker & Hostetler LLP

(57) ABSTRACT

Ring resonators and methods of making and using the same are disclosed. In certain embodiments, a ring resonator may include a waveguide comprising a pump bus and a signal bus disposed adjacent a ring guide, the pump bus and signal bus configured to couple electromagnetic signals to and from ring guide, wherein at least a portion of the waveguide comprises erbium-doped silica and a cladding material disposed adjacent the waveguide, wherein the cladding material exhibits an index of refraction that is lower than an index of refraction of the waveguide.

20 Claims, 3 Drawing Sheets

(56) References Cited

U.S. PATENT DOCUMENTS

| | | |
|---|---|---|
| 2004/0120638 A1 | 6/2004 | Frick |
| 2004/0136681 A1 | 7/2004 | Drewery et al. |
| 2008/0074736 A1 | 3/2008 | Kuo et al. |
| 2009/0231686 A1 | 9/2009 | Atkins et al. |
| 2016/0124251 A1 | 5/2016 | Zhang et al. |

OTHER PUBLICATIONS

Bradley, et al., Monolithic Erbium- and Ytterbium-Doped Microring Lasers on Silicon Chips, Optics Express, vol. 22, No. 10, May 2014, OSA Publishing, USA, p. 12226-12237.

Hsiao, et al., Planar Glass Waveguide Ring Resonators With Gain, Optics Express, vol. 15, No. 26, Dec. 24, 2007, OSA Publishing, USA, p. 17783-17797.

Zeng et al. "Theoretical Design and Analysis: A Ring Resonator Filter Using Er3+/Yb3+—Co-Doped Phosphate Waveguides" Photonics Spectra, Jul. 2011, 8 pages.

HIGH-Q AMPLIFIED RESONATOR

RELATED APPLICATION

The present application is a continuation of U.S. application Ser. No. 15/407,966, "HIGH-Q AMPLIFIED RESONATOR" (filed Jan. 17, 2017), which claims priority to and the benefit of U.S. Application No. 62/398,263, "HIGH-Q AMPLIFIED RESONATOR" (filed Sep. 22, 2016), the entirety of which application is incorporated herein by reference for any and all purposes.

FIELD

This application is generally related to amplified resonators. In particular, the application describes chip-scale, amplified ring resonators.

BACKGROUND

Surveillance and identification of target radio signals in the dynamically changing RF spectral landscape requires various broadly-tunable RF filters. In view of potential jamming noises, RF notch filters with narrow resolution bandwidth and high extinction are desired to recover the signals of interest with high fidelity.

Photonics-enabled RF filters are promising since provide potentially wider tunability and re-configurability in comparison to traditional electronic filters. Photonics-enabled RF filters also exhibit improved immunity to electromagnetic interference (EMI) over traditional electronic filters. Sustained efforts in the past decades for developing RF photonic filters for military applications have demonstrated significant benefits, such as low loss, wideband tunability and immunity to EMI.

However, almost all conventional RF filters employ discrete fiber optical components resulting in size, weight and power (SWAP) characteristics that are not consistent with operating in constrained environments. More recent efforts in developing chip-scale RF photonics have produced devices with much smaller sizes than their fiber counterparts but at the cost of lower performance. For example, chip-scale optical ring resonator filters have exhibited bandwidths as low as about 200 MHz. While this may be sufficient for channelizer applications, it is undesirable for a notch filter.

Achieving large extinction in addition to high Q in a ring resonator poses additional challenges. High extinction using ring resonators can be achieved by accomplishing critical coupling, where the energy dissipation in the ring is equal to the net coupling losses. Power coupling ratios are mainly controlled by the gap between the ring waveguide and the bus waveguides. However, process variation may not allow reproducible fabrication of a target structure. While tunable coupler structures may assist with reproducible fabrication, it introduces excess loss limiting a high Q factor.

SUMMARY

The foregoing needs are met, to a great extent, by the application including active waveguides doped with optical gain elements such as erbium (Er) to achieve a high-Q resonator cavity.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1:
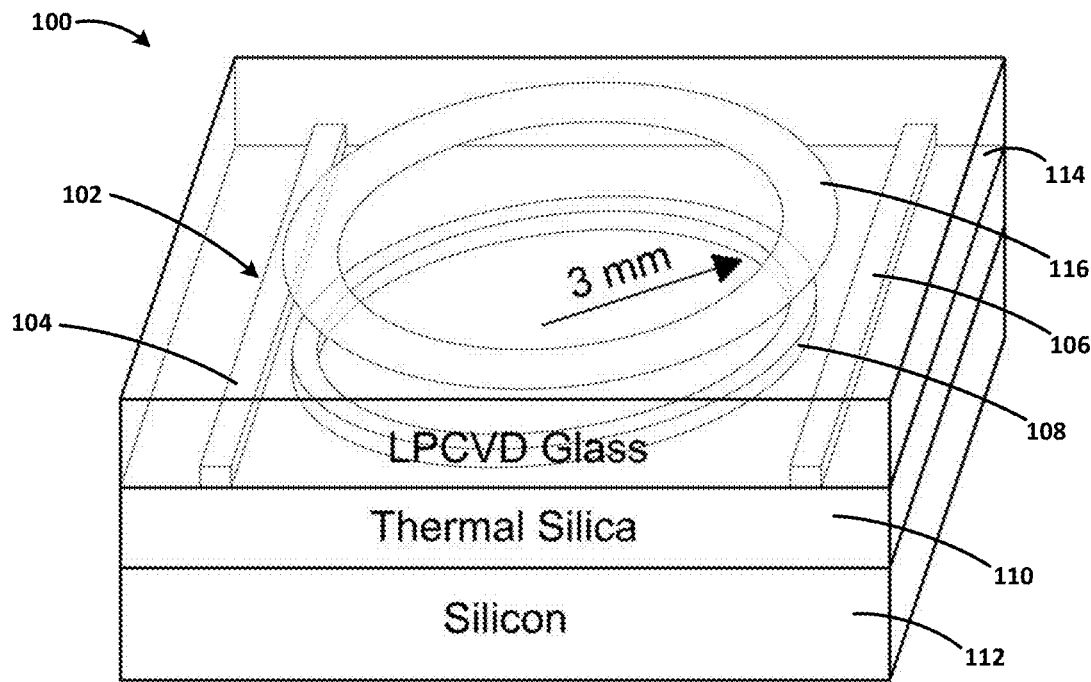
FIG. 1 illustrates an optically amplified ring resonator according to an aspect of this application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

According to an aspect of the application, a chip-scale radio-frequency (RF) photonic filter is described. The filter has a tuning range of about 10 GHz and 3-dB bandwidth of less than 2 MHz. As a result, filter's ability to receive and process ultra-wideband RF signals is significantly improved.

In an embodiment, to achieve such narrow bandwidths with chip-scale ring resonators, the application employs an active waveguides doped with optical gain elements, such as for example, erbium (Er). The optical gain available from the Er-doped waveguides compensates for the propagation loss and the excess coupler loss to achieve a high Q resonator cavity. In another embodiment, the gain of the active waveguide can be tuned by adjusting the power of the pump laser. This can achieve critical coupling by increasing the gain (i.e., decreasing the loss) of the ring resonator. The ring resonator may be slightly under-coupled without the gain, which can be expressed as in the structure shown in FIG. 2:

$$K_1 < \alpha + K_2,$$

where $K_i(i=1, 2)$ is the power coupling coefficient and $\alpha$ is the propagation loss round trip in the ring. Reduction of $\alpha$ with the help of optical gain can equalize the above equation, achieving the critical coupling. A benefit of these tuning techniques is obviating the excess loss of the tunable coupler.

FIG. 1 illustrates and exemplary ring resonator 100 according to aspects of the present disclosure. As shown, the ring resonator 100 may include an erbium (Er) doped silica waveguide 102 having background loss <2 dB/m, which translates to achievable Q of ~$6\times10^6$. Further improvement toward an order of magnitude of Q~$10^8$ may be achieved by utilizing optical gain from optically-pumped Er ions to reduce the waveguide loss to <0.02 dB/m. In particular, the waveguide 102 may include a signal bus 104 and a pump bus 106 disposed adjacent a ring 108 and configured to couple signals therebetween. One or more of the ring 108 and the buses 104, 106 may be formed from Er-doped silica. Various coupling geometries between the ring 108 and the buses 104, 106 may be used, as described in further detail below. One or more of the ring 108 and the buses 104, 106 may be disposed on an un-doped layer 110, which may be formed from passive glass such as thermal silica grown on a silicon layer 112. A cladding layer 114 may be disposed on one or more of the ring 108 and buses 104, 106 opposite the un-doped layer 110. The cladding layer 114 may be formed from a material having lower index of refraction relative to the waveguide 102. The cladding layer 114 may be formed from the same material as the un-doped layer 110. A resistive metallic film 116 may be disposed on the cladding layer 114 and may be configured as a thermo-optic phase shifter (e.g., heater) to adjust the refractive index of the waveguide 102. The thermal film 116 may be formed from metal. Other thermally conductive materials may be used.

Figure 3:
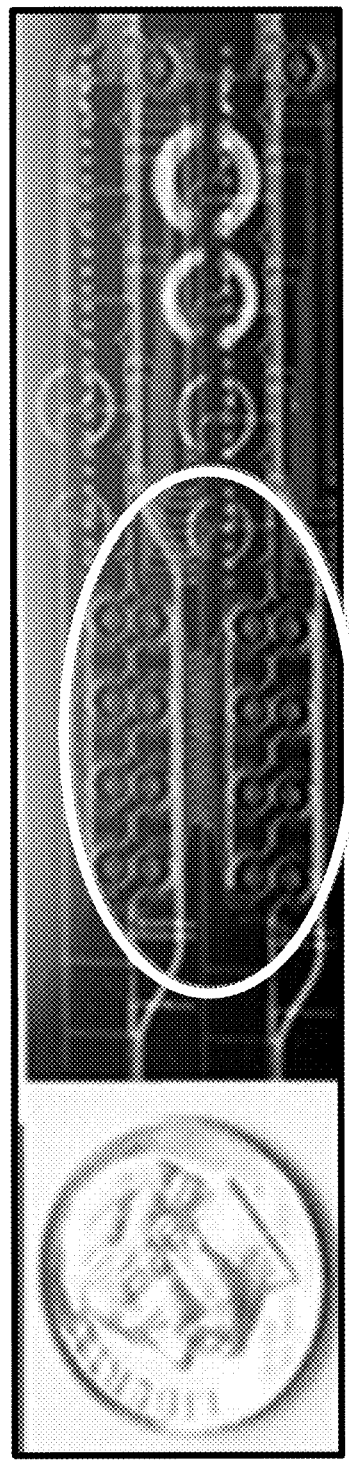
FIG. 3 illustrates chip-scale variable delay lines using cascaded ring resonators according to an aspect of this application.

In operation, the ring resonator 100 has a free-spectral range (FSR) of about 10 GHz. The ring resonator 100 exhibits a Q of at least $10^8$ for a filter resolution narrower than 2 MHz. Although a single ring resonator 100 is illustrated, it is understood that the ring resonator 100 may be used for much more complex and capable filters by cascading multiple such ring resonator 100 with negligible optical loss, such as illustrated in FIG. 3, for example. As an example, tunable delay lines may comprise cascaded ring resonators (e.g., ring resonator 100) using passive (undoped) glass waveguides having 2% index contrast.

Rind-Resonator RF Photonic Filter Design

Infinite impulse response (IIR) RF photonic filters using ring resonators may have much sharper filter responses than finite impulse response (FIR) filters as the number of FIR taps that can be practically implemented is limited by the complexity of the circuit. As shown in Table 1, ring resonator RF filters have been implemented in various material platforms and measured for a telecom wavelength of 1550 nm. Table 1 lists an integrated photonic RF filter utilizing Stimulated Brillouin Scattering (SBS), which requires high power (>2 W) pump light to induce Brillouin back scattering. Table 1 shows that the performance of the integrated-photonic RF filters need to improve to be competitive with the electronic microwave filters having passband widths greater than 10 MHz and less than 50 dB extinction in the case of notch filtering.

TABLE 1

| Waveguide | Propagation Loss | FSR | 3 dB bandwidth | Extinction (notch filter) |
|---|---|---|---|---|
| Silica (2% index contrast) ring | 3 dB/m | 21.6 GHz | 196 MHz | N.A. |
| Silicon ring resonator | 25 dB/m | 43 GHz | 625 MHz | 33 dB |
| Silicon Nitride ring resonator | 2.9 dB/m | 9.7 GHz | 300 MHz | 15 dB |
| Chalcogenide (SBS) | 30 dB/m | 6 GHz tuning range | 126 MHz | 20 dB |
| LGS Goal | <0.02 dB/m | >10 GHz | <2 MHz | >30 dB |

Figure 2:
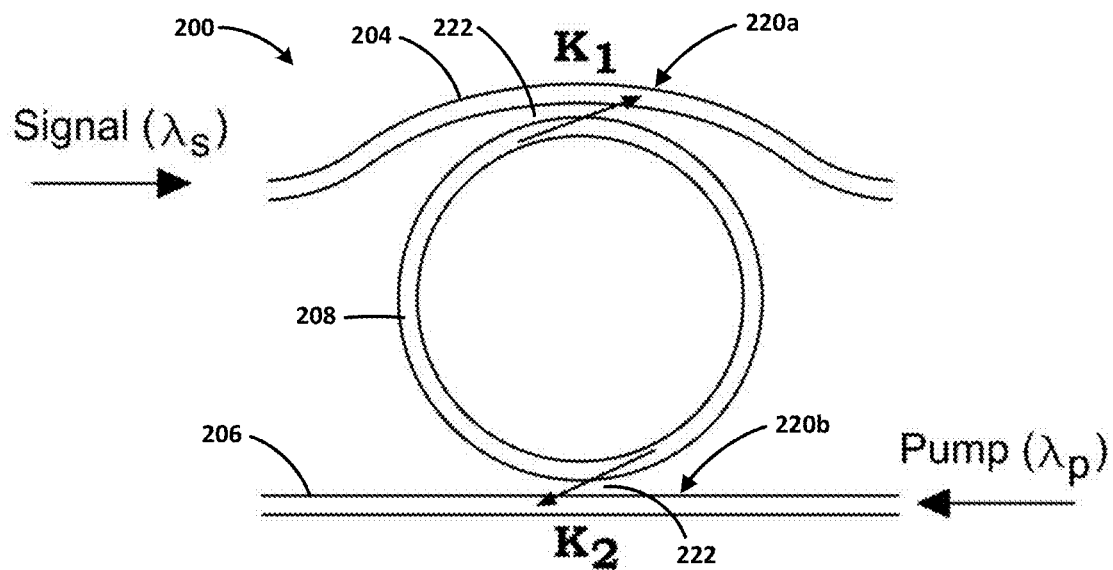
FIG. 2 illustrates a ring resonator according to an aspect of this application.

One challenge in reducing the bandwidth of the ring resonator is to minimize the loss mechanism affecting the quality ($Q=\omega/\Delta\omega$) factor of the resonator. The achievable Q factor of a ring resonator scales as $Q\sim(\alpha(\lambda_s)+\kappa_1(\lambda_s)+\kappa_2(\lambda_s))^{-1}$, where $\alpha$ is the optical propagation loss inside the ring and $\kappa_{1(2)}$ is the power coupling ratio between the ring and the signal/pump bus of the waveguide all measured at signal wavelength $\lambda_s$. This is shown, for example, in FIG. 2, illustrating a waveguide 202 including a signal bus 204 and a pump bus 206 disposed adjacent a ring 208 and configured to couple signals therebetween. The waveguide 202 may be similar to the waveguide 102 and may be configured in a ring resonator or other components, as described herein. The propagation loss of tightly-bendable (~1 mm) planar-circuit waveguides is typically greater than 2 dB/m, which may limit the achievable intrinsic Q to about $6\times10^6$ and the filter resolution to about 200 MHz. Alternatively, extremely low-loss dilute-mode silicon nitride waveguides having a large bend radius (9.65 mm) may only support about 2 GHz FSR, which may be too narrow for ultra-wideband RF reception.

According to embodiments of the present disclosure, techniques are described to achieve large extinction and high Q. In particular, low-loss Er-doped silica waveguides (e.g., waveguides 102, 202 (FIGS. 1-2)) may be configured to exhibit a background loss of less than about 2 dB/m. Such as configuration facilitates an achievable Q of about $7\times10^5$. Additionally or alternatively, a Q of about $10^8$ may be achieved by utilizing the optical gain from optically-pumped Er ions to reduce the waveguide loss to less than about 0.02 dB/m. The target loss of less than 0.02 dB/m corresponds to a required unit gain in the waveguide of less than about 2 dB/m.

According to embodiments of the present disclosure, ring waveguides (e.g., waveguides 102, 202 (FIGS. 1-2)) may be configured to be slightly multi-moded to reduce the cavity loss. Such waveguides have wider waveguide width than required to be strictly single moded. Thus they may support one or two higher order modes than the fundamental mode in theory but those higher order modes dissipate owing to the scattering loss at the waveguide surface in practice, while more spatially confined fundamental mode does not suffer from the scattering loss. Additionally, or alternatively, the waveguide in the coupler region is designed to be strictly single moded to avoid exciting higher order spatial modes in the ring.

According to embodiments of the present disclosure, ring waveguides (e.g., waveguides 102, 202 (FIGS. 1-2)) may be pumped with "in-band" pumping, instead of 980 nm pumping, for matching the signal and pump wavelengths. As an example, C-band operation may utilize a 1480 nm distributed feedback (DFB) pump laser. As another example, L-band operation may utilize a 1530 nm DFB pump laser. As such, the in-band pumping minimizes quantum defect heating and the thermal loading of the resonator (e.g., ring resonator 100 (FIG. 1)).

According to embodiments of the present disclosure, ring waveguides (e.g., waveguides 102, 202 (FIGS. 1-2)) may comprise directional couplers for coupling the signal and pump into the ring resonator. In reference to FIG. 2, for example, directional couplers may be configured to facilitate coupling between the ring 208 and one or more of the busses 204, 206. Directional couplers may be selected due at least to low excess loss (<0.2 dB) among 2×2 couplers. In certain embodiments, the power coupling may be configured very small for $\kappa_1(\lambda_s)$, $\kappa_2(\lambda_s)$, and $\kappa_1(\lambda_p)$ to accomplish high Q. The coupling ratio depends on the target Q and it may be as small as $6 \times 10^{-4}$ to achieve $Q \sim 10^8$. In certain embodiments, the coupling between the ring and the pump bus at the pump wavelength, $\kappa_2(\lambda_p)$, may be sufficiently high for efficient pump light coupling into the resonator. In one embodiment, concentric-curved directional coupler designs 220a may be employed. Concentric-curved direction coupler designs may exhibit reduced dependence to wavelength for the signal bus coupler. In another embodiment, symmetric or straight couplers 220b may be used to take advantage of its naturally high wavelength sensitivity to achieve substantially different $\kappa_2(\lambda_s)$ and $\kappa_2(\lambda_p)$.

According to embodiments of the present disclosure, ring waveguides (e.g., waveguides 102, 202 (FIGS. 1-2)) may be configured to leverage gain tuning of the coupling ratio. For example, the coupler gaps (e.g., gaps 222 (FIG. 2)) may be configured wider than what would nominally work for critical coupling for a purely passive ring resonator with the same waveguide dimensions (i.e., under coupling). As such, critical coupling may be achieved by adjusting the net loss of the ring resonator by pump laser current control.

According to embodiments of the present disclosure, ring waveguides (e.g., waveguides 102, 202 (FIGS. 1-2)) may be configured to balance Q and extinction. As an example, in the double bus geometry, such as illustrated in FIGS. 1-2, higher extinction may be achieved at the expense of Q by adjusting the ratio between $\kappa_1(\lambda_s)$ and $\kappa_2(\lambda_s)$. Yet another consideration is filter tuning. As an example, the resonance wavelength of the ring resonator may be tuned using a thermo-optic phase shifter such as thermal film 116 (FIG. 1). The thermo-optic phase shifter may be or comprise a thin resistive metal strip deposited on top of the ring. Thermo-optic phase shifters are nearly lossless when the metal layer is sufficiently separated from the waveguide core to avoid any modal overlap with the metal. Also, $\pi$ phase shift can be achieved with only ~100 mW over ~1 ms time scale.

Methods

Figure 4:
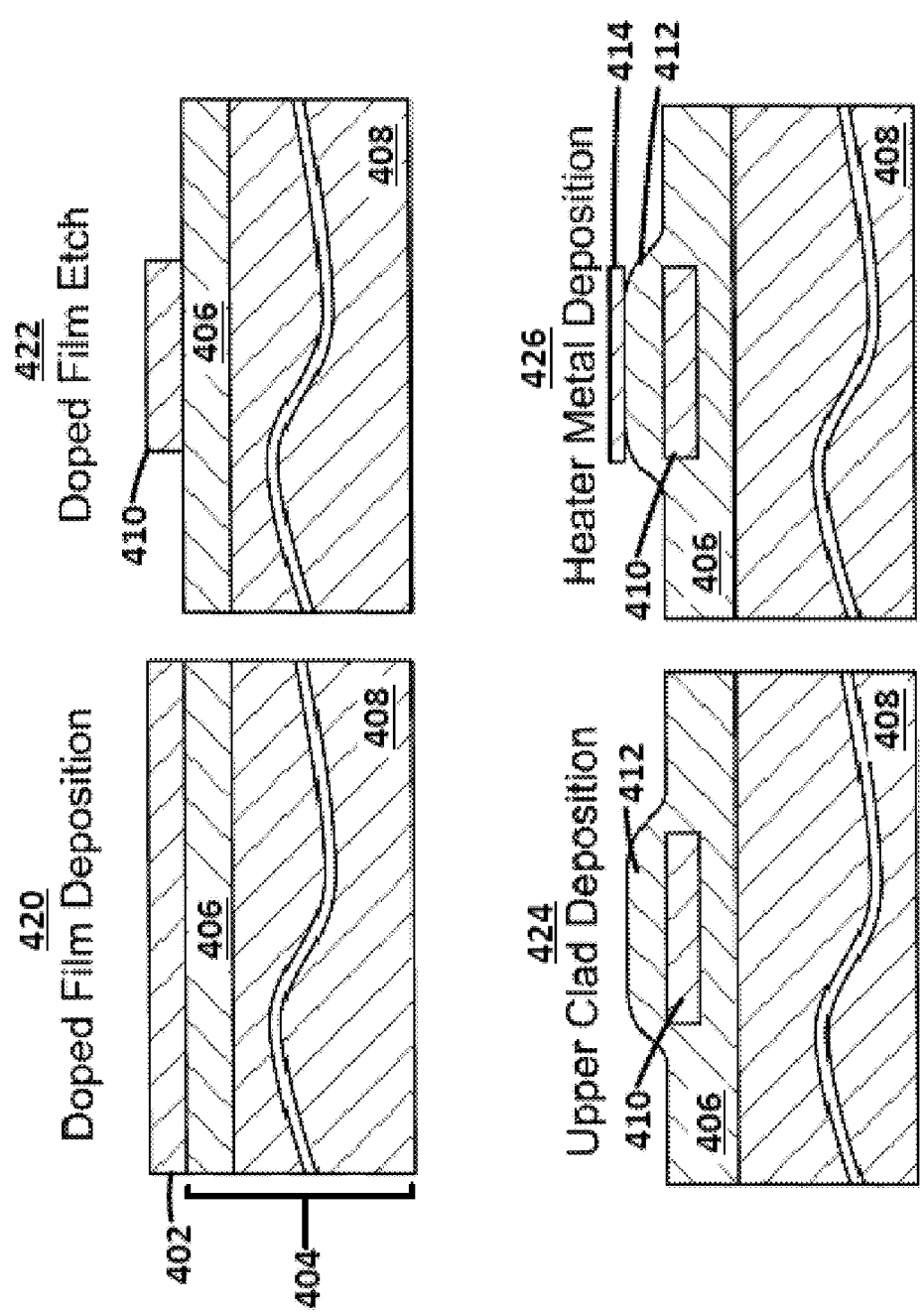
FIG. 4 illustrates a deposition technique according to an aspect of this application.

According to embodiments of the present disclosure, ring waveguides (e.g., waveguides 102, 202 (FIGS. 1-2)) may be processed according to the techniques illustrated in FIG. 4. As an initial matter, an Er-doped, multi-element (Ge, Si, P, Al, Er) oxide glass film 402 may be deposited on a base wafer 404, at step 420. The base wafer may comprise a thermal oxide 406 grown on silicon 408. Other materials may be used. The Er-doped glass film 402 may be deposited in Plasma Enhanced Chemical Vapor Deposition (PECVD) chamber. The waveguide 410 is then defined by contact lithography and etched to form a silica planar light wave circuit (PLC), at step 422. Thereafter, a lower index upper cladding glass 412 is deposited using a LPCVD (Low Pressure CVD) process, at step 424. Additionally, a heater metal film 414 may be deposited on the cladding glass 412, at step 426.

According to embodiments of the present disclosure, the glass composition of at least the Er-doped glass film 402 may be controlled allowing for better control over the Er concentration. For example, higher doping concentration of Er ions is possible with PECVD-grown glasses than in typical Er-doped germano-silicate glasses because the plasma-enhanced non-equilibrium deposition process promotes higher P concentration, which enhances Er solubility. Higher erbium concentration may allow for efficient amplification in a tight ring. Efficiency suffers at very high erbium concentration due to pair-induced quenching, where the energy in the Er excited state is dissipated through non-radiative channels. The benefit of higher Er concentration must also be balanced against phase separation and ion clustering, which leads to increased optical background loss.

A post-deposition anneal step may also be performed to reduce precipitates in the film. The precipitates include clusters with high Er composition. An optimized silica matrix composition and film annealing can help create dense films, where the Er ions are thoroughly incorporated into the matrix.

Glass composition control of at least the Er-doped glass film 402 may be used to adjust the index of the active waveguide 410 such that the refractive index contrast with respect to the surrounding cladding glass 412 is larger than 1.5%. The high index contrast allows for tight bend radius (<3 mm), which may be required in order to achieve a free spectral range >10 GHz in the ring resonator. Index control is achieved by adjusting the relative concentration of Al, Ge (promoting higher index) and P (promoting lower index).

Exemplary results with an Er-doped waveguide amplifier are provided herein. In particular, Er-doped glass films were deposited with Er concentration as high as about 2 wt %. In one embodiment, a 20 cm (approximate) single mode Er-doped waveguide with 0.8 wt % Er concentration was developed exhibiting 20 dB gain difference between 980 nm pump-on and pump-off states.

Testing

Wafer-level testing was performed using Scanning Electron Microscopy (SEM), to validate gaps between the ring resonator and the bus waveguides. SIMS (Secondary Ion Mass Spectrometry) was also performed to measure dopant concentration and uniformity. Waveguide background propagation loss was analyzed using standard cut-back methods. The loss was less than 2 dB/m.

Waveguide amplifier testing was performed to evaluate the performance of the waveguide amplifier. Specifically, gain and saturated output power vs. pump current was tested.

Ring-resonator characterization was also performed on various designs. Here, the target coupling ratio was derived from the designs to achieve the high Q resonator. The (polarization-dependent) transmission properties of the ring resonator were tested using a narrow-linewidth (~1 kHz) tunable laser.

According to an embodiment, the amplified waveguide technology described above may be employed in one or more of the following technologies including FIR filters, IIR filters, and on-chip narrow-linewidth lasers. For FIR filters, generally, the complexity of the tap and delay is often limited by the length of the delay line that can be implemented on chip. In high-index contrast systems, such as Silicon on Insulator (SOI) waveguides, relatively high propagation loss (1-2 dB/cm) is the limiting factor. In a low-index contrast system, such as 0.6% index contrast glass PLC, bend losses constrain the delay length that can be implemented on chip. The high index contrast system with on-chip optical gain offer of this application offers great flexibility in implementing multi-tap filters with long delays on chip.

For IIR filters or other filters (e.g., Mach-Zehnder interferometer), better filter responses can be achieved by including amplified ring resonators and/or cascading ring resonators. The improved responses may include flat-top passband and sharper skirt.

On-chip narrow-linewidth laser are important for coherent RF photonic filters. Er-doped waveguides with cascaded ring resonators can be used to build an on-chip tunable narrow-linewidth laser. When pumped with an athermal 980-nm pump laser, the narrow-linewidth lasers will have much less sensitivity to temperature variation than similar structures fabricated with III-V or III-V on silicon.

More stringent requirements are required for integrated RF photonic devices in comparison with photonic integrated circuits for digital communication. Namely, RF photonic devices require higher extinction and modulation linearity. Hybrid integration with amplified waveguides is an attractive platform for high-performance devices requiring target functionalities. These devices may include but are not limited to high-extinction modulators, amplifier pump lasers, and high linearity detectors. Specifically, the devices can be integrated on a single chip with the amplifier waveguide providing on-chip gain to mitigate the losses associated with the hybrid integration process. In an embodiment, the high-Q amplified optical resonator may be integrated on chip. Here, the all optical logic subsystem includes a PLC with flip-chip bonded III-V active devices, indicated by the circles.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures.

What is claimed is:

1. A ring resonator comprising:
a waveguide comprising a pump bus and a signal bus disposed adjacent a ring guide, the pump bus and signal bus configured to couple electromagnetic signals to and from ring guide, wherein at least a portion of the waveguide comprises rare-earth element doped silica; and
a cladding material disposed adjacent the waveguide, wherein the cladding material exhibits an index of refraction that is lower than an index of refraction of the waveguide,
wherein the power coupling of $\kappa_1$ ($\lambda_s$), $\kappa_2$ ($\lambda_s$), and/or $\kappa_1(\lambda_p)$, $\kappa_2$ ($\lambda_p$) are configured such that the ring resonator exhibits a quality factor (Q) of greater than $10^5$ for the signal and/or pump, where ($\lambda_p$) is a pump wavelength, ($\lambda_s$) is a signal wavelength, and ($k_1$) is a coupling coefficient of one of the signal bus and the pump bus and the ring guide, and where ($k_2$) is a pump coefficient of the other bus and the ring guide.

2. The ring resonator of claim 1, wherein the pump bus and the signal bus are integrated as a unitary waveguide.

3. The ring resonator of claim 1, wherein the ring resonator exhibits a propagation loss of less than 2 dB/m.

4. The ring resonator of claim 1, wherein the ring resonator exhibits a propagation loss of less than 1 dB/m.

5. The ring resonator of claim 1, wherein the ring resonator exhibits a free spectral range (FSR) of greater than 10 GHz.

6. The ring resonator of claim 1, wherein the ring resonator exhibits an extinction of greater than 30 dB.

7. The ring resonator of claim 1, wherein pump bus or the signal bus is directionally coupled with the ring.

8. The ring resonator of claim 1, further comprising a thermal film disposed adjacent the cladding layer, the thermal film configured to conduct thermal energy to effect a phase shift in the waveguide.

9. A method of using a ring resonator, the ring resonator comprising a waveguide comprising a pump bus and a signal bus disposed adjacent a ring guide, the pump bus and signal bus configured to couple electromagnetic signals to and from ring guide; and a cladding material disposed adjacent the waveguide, wherein the cladding material exhibits an index of refraction that is lower than an index of refraction of the waveguide, the method comprising:
configuring a pump wavelength ($\lambda_p$), a signal wavelength ($\lambda_s$), a coupling coefficient ($k_1$) of the signal bus and the ring and a pump coefficient ($k_2$) of the pump bus and the ring such that the net coupling loss and propagation loss in the ring of the signal ($\lambda_s$) are modified upon application of pump ($\lambda_p$).

10. The method of claim 9, wherein the configuring a pump wavelength ($\lambda_p$), a signal wavelength ($\lambda_s$), a coupling coefficient ($k_1$) of the signal bus and the ring and a pump coefficient ($k_2$) of the pump bus and the ring achieves critical coupling as represented by:

$$K_1=(\alpha-g)+K_2,$$

where $K_i$(i=1, 2) is the power coupling coefficient, a is the propagation loss round trip in the ring, and g is the optical gain per round trip provided by the pump.

11. The method of claim 9, wherein the ring resonator exhibits a quality factor (Q) of greater than $10^5$.

12. The method of claim 10, further comprising adjusting a ratio of $k_1(\lambda_s)$ and $k_2(\lambda_s)$ to modify an extinction of the ring resonator.

13. The method of claim 12, wherein the ring resonator exhibits an extinction of greater than 30 dB.

14. The method of claim 9, wherein the ring resonator exhibits a propagation loss of less than 2 dB/m.

15. The method of claim 9, wherein the ring resonator exhibits a propagation loss of less than 2 dB/m.

16. The method of claim 9, wherein the ring resonator exhibits a free spectral range (FSR) of greater than 10 GHz.

17. A method of manufacturing a ring resonator, the method comprising:
disposing a rare-earth element doped silica film on a base wafer;
forming a waveguide from the rare-earth element doped silica film using one or more of contact lithography and etching, wherein the waveguide comprises a pump bus and a signal bus disposed adjacent a ring guide, the pump bus and signal bus configured to couple electromagnetic signals to and from ring guide;
disposing a cladding layer adjacent the waveguide, wherein the cladding material exhibits an index of refraction that is lower than an index of refraction of the waveguide,
wherein the power coupling of $\kappa_1$ ($\lambda_s$), $\kappa_2$ ($\lambda_s$), and/or $\kappa_1(\lambda_p)$, $\kappa_2$ ($\lambda_p$) are configured such that the ring resonator exhibits a quality factor (Q) of greater than $10^5$ for the signal and/or pump, where ($\lambda_p$) is a pump wavelength, ($\lambda_s$) is a signal wavelength, and ($k_1$) is a coupling coefficient of one of the signal bus and the pump bus and the ring guide, and where ($k_2$) is a pump coefficient of the other bus and the ring guide.

18. The method of claim 17, wherein the rare-earth element doped silica film is disposed on the base wafer using Plasma Enhanced Chemical Vapor Deposition (PECVD).

19. The method of claim 17, wherein the cladding layer is disposed adjacent the waveguide using a LPCVD (Low Pressure CVD).

20. The method of claim 17, further comprising disposing a thermal film adjacent the cladding layer, wherein the thermal film is configured to conduct thermal energy to effect a phase shift in the waveguide.

* * * * *